United States Patent
Stumpf et al.

(10) Patent No.: US 12,119,702 B1
(45) Date of Patent: Oct. 15, 2024

(54) SYSTEM AND METHOD FOR PROVIDING OPERATION INFORMATION TO CONFIGURABLE DEVICES

(71) Applicant: Dell Products L.P., Round Rock, TX (US)

(72) Inventors: Michael J. Stumpf, Cedar Park, TX (US); Sandor Tibor Farkas, Round Rock, TX (US); Sanjiv Sinha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 18/192,300

(22) Filed: Mar. 29, 2023

(51) Int. Cl.
*H02J 7/02* (2016.01)
*G06F 3/06* (2006.01)
*G06F 9/4401* (2018.01)
*H02J 7/00* (2006.01)

(52) U.S. Cl.
CPC .............. *H02J 7/02* (2013.01); *G06F 3/0632* (2013.01); *G06F 9/4401* (2013.01); *H02J 7/00711* (2020.01); *G05B 2219/25268* (2013.01)

(58) Field of Classification Search
CPC .......... G06F 9/4401; G06F 3/0632; G05B 2219/25268; H02J 7/02; H02J 7/00711
See application file for complete search history.

(56) References Cited

U.S. PATENT DOCUMENTS

| | | | |
|---|---|---|---|
| 2003/0105609 A1* | 6/2003 | Conway | G06F 1/0321 702/108 |
| 2006/0271317 A1* | 11/2006 | Ammerman | G01R 31/2841 702/66 |
| 2012/0060059 A1* | 3/2012 | Johnson | G06F 11/261 714/E11.178 |
| 2021/0377942 A1* | 12/2021 | Lopez | H04L 5/0044 |
| 2024/0137067 A1* | 4/2024 | Kong | H04B 1/7172 |

* cited by examiner

*Primary Examiner* — Glenn A. Auve
(74) *Attorney, Agent, or Firm* — Womble Bond Dickinson (US) LLP

(57) ABSTRACT

Methods and systems for providing computer implemented services using configurable hardware components are disclosed. To update operation of a configurable hardware component, a large amount of data may be provided to a single input/output pin of the configurable hardware component. The large amount of data may be encoded in a complex waveform corresponding with at least eleven bits of digital data. The complex waveform may be interpreted by the configurable hardware component to obtain the large amount of data. Using the large amount of data, the configurable hardware component may update its operation to be in condition for providing the computer implemented services.

20 Claims, 7 Drawing Sheets

US 12,119,702 B1

SYSTEM AND METHOD FOR PROVIDING OPERATION INFORMATION TO CONFIGURABLE DEVICES

FIELD

Embodiments disclosed herein relate generally to updating device operation. More particularly, embodiments disclosed herein relate to systems and methods to provide information usable to update device operation.

BACKGROUND

Computing devices may provide computer implemented services. The computer implemented services may be used by users of the computing devices and/or devices operably connected to the computing devices. The computer implemented services may be performed using configurable hardware components, and the computer implemented services may depend on configurations of the configurable hardware components.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
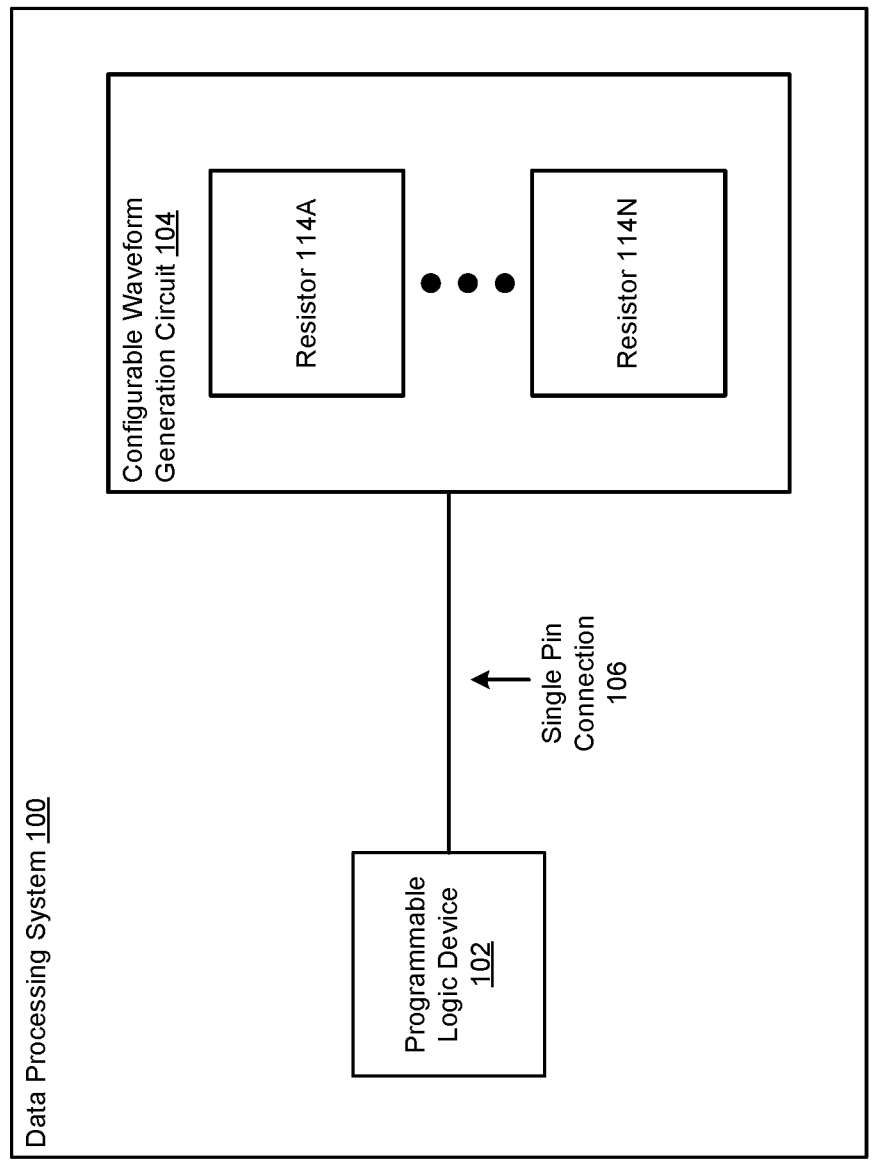
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, hardware components may be used. The computer implemented services may include any type and/or quantity of computer implemented services. Furthermore, the type and/or quantity of the computer implemented services, and/or how the computer implemented services are to be provided, may depend on operation of the hardware components.

To configure a hardware component, code may be read and executed by the hardware component to initiate operation of the hardware component. Once operating, the hardware component may contribute to computer implemented services in a first manner. However, the first manner may not be sufficient for the computer implemented services to be provided in a desired manner.

To contribute to the computer implemented services in a desired manner, operation of the hardware component may be updated. The operation may be updated using a large amount of data that may be provided to the hardware component. The large amount of data may specify operation information that includes information usable to guide operation of the hardware component. Doing so may place the hardware component in condition to participate in the computer implemented services in a desired manner.

To provide the large amount of data to the hardware component, one or more pins (e.g., general purpose input/output pins) of the hardware component may be used. For example, the pins may be used to obtain electrical signals (e.g., the provided large amount of data) representing the operation information.

However, the hardware component may include a limited number of options (e.g., a limited number of pins) for obtaining the large amount of data. For example, due to the limited number of the pins (which may be used for other purposes), dedicating pins for obtaining the large amount of data may limit the types of operations that the hardware component may perform.

By dedicating multiple pins for obtaining the large amount of data, the hardware component may be unable to use the pins for other purposes such as, for example, data collection, communications, etc.

To increase the types of operations that the hardware component may perform, rather than dedicating the multiple pins, a single pin of the hardware component may be dedicated for obtaining the large amount of data. To do so, the single pin may be adapted to obtain a complex waveform (through which the large amount of data may be encoded) corresponding to at least eleven bits of digital data. Once the complex waveform is provided to the hardware component using the single pin, the hardware component may interpret the large amount of data from the complex waveform.

By doing so, data processing systems, in which the hardware components are included, may be improved by providing additional functionalities that may otherwise not be available if not for additional input/output pins that have not been dedicated for obtaining operation information. For example, the additional input/output pins may be used for purposes such as data collection, communications, etc.

In an embodiment, a method for providing computer implemented services is provided.

The method may include identifying, by a programmable logic device (PLD), a start up of a host data processing system; and during the start up: initiating, by the PLD, generation of a complex waveform by a configurable waveform generation circuit, wherein the configurable waveform generation circuit is adapted to generate a number of unique complex waveforms corresponding to at least eleven bits of digital data; monitoring, by the PLD and using a single pin of the PLD, the complex waveform during a period of time; obtaining, by the PLD, digital data based on the monitoring of the complex waveform; updating, by the PLD, operation of the PLD to obtain an updated PLD; and providing, by the updated PLD, computer implemented services.

Initiating generation of the complex waveform may include charging a chargeable power source of the configurable waveform generation circuit to a predetermined charge level; and after reaching the predetermined charge level, discontinuing the charging to initiate the generation of the complex waveform.

Monitoring the complex waveform may include identifying a period of the complex waveform; identifying a frequency of the complex waveform; and identifying a duty cycle of the complex waveform.

Obtaining the digital data may include identifying a first value of a first resistor of the configurable waveform generation circuit based on the period of the complex waveform; identifying a second value of a second resistor of the configurable waveform generation circuit based on the frequency of the complex waveform; and identifying a third value of a third resistor of the configurable waveform generation circuit based on the duty cycle of the complex waveform.

Obtaining the digital data may further include obtaining a first bit sequence based on the first value of the first resistor; obtaining a second bit sequence based on the second value of the second resistor; and obtaining a third bit sequence based on the third value of the third resistor.

Obtaining the digital data may further include obtaining a combination of bit sequences that may include the first bit sequence; the second bit sequence; and the third bit sequence.

The configurable waveform generation circuit may include a first portion that may include a chargeable power source adapted to provide power to the configurable waveform generation circuit while charged, and a first resistor, wherein a decay rate of the complex waveform is based on a the first resistor; a second portion that may include a triangular wave generator adapted to generate a triangular waveform, and a second resistor, wherein a frequency of the complex waveform is based on the second resistor; and a third portion that may include a third resistor, wherein a duty cycle of the complex waveform is based on the third resistor, and adapted to generate the complex waveform.

The configurable waveform generation circuit may include a first timer; and a second timer, wherein the first time and the second timer are cascaded so that the first timer operates as a mask for the second timer.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, a hardware component (e.g., a programmable logic device (PLD)) may be used. The operation of the hardware component may be modified using operation information. For example, upon power on the hardware component may read and execute code causing the hardware component to be configured and operate in a first manner. However, the operation of the hardware component once configured may not be sufficient to contribute to desired computer implemented services.

To participate in the computer implemented services, the operation of the hardware component may be updated.

For example, a consumer of the computer implemented services may require a specific type of service. Upon initial configuration, the PLD may operate in a first manner that is incompatible with the specific type of service. To contribute to the service, the operation of the PLD may be to meet corresponding requirements for the specific type of service.

To modify operation of the PLD, operation information may be obtained by the PLD. The operation information may indicate, for example, (i) requirements to be met by the PLD, (ii) possible changes to the operation of the PLD, (iii) an action that, when performed, modifies settings or other characteristics of the PLD that impact the manner in which the PLD operates, and/or (iv) other types of information usable to guide changes in operation of the PLD. Once obtained, operation of the PLD may be updated based on the operation information to place the PLD in condition to participate in the desired computer implemented services.

However, the operation information may include a large amount of data (e.g., a large number of bits), and the PLD may include a limited number of options for obtaining the operation information. For example, the operation information may be obtained using one or more pins (e.g., general purpose input/output pins) of the PLD. The pins may be used to obtain electrical signals representing the operation information.

Due to the limited number of the pins (which may be used for other purposes), dedicating pins for obtaining operation information may limit the types of operations that the PLD may perform. For example, by dedicating multiple pins for obtaining the operation information, the PLD may be unable to use the pins for other purposes such as, for example, data collection, communications, etc.

In general, embodiments disclosed herein relate to methods, systems, and devices for providing computer implemented services. To provide the computer implemented services, the disclosed systems may include programmable logic devices that may update their operation using operation information obtained using a limited number of pins (e.g., which may support general purpose communications via input-output, etc.) of the programmable logic devices. To do so, the programable logic devices may receive and interpret complex waveforms on which larger amounts of data may be encoded (e.g., when compared to simple encoding methods such as binary logic, voltage level manipulation, etc.). The complex waveforms may encode digital information (data) into a number of characteristics of the complex waveforms including, for example, decay rate (e.g., a rate at which magnitude of a wave reduces over time, such as a constant in an exponential equation or a percentage reflecting a level of decay from an initial value within a predetermined duration of time, etc.) or duration (e.g., a duration of time from when a magnitude begins to decrease to which it reaches a particular lower value), duty cycle, period/frequency, etc. The complex waveforms may be read by the programmable logic devices using a single pin (or reduced number of pins when compared to using multiple pins to read multiple simple waveforms which may encode similar amounts of information). Consequently, fewer pins of the programmable logic devices may be dedicated for acquisition of operation information thereby allowing for programmable logic devices to provide additional functionalities using the available pins.

To do so, data processing system 100 may include programmable logic device (PLD) 102 and configurable waveform generation circuit (CWGC) 104. Each of these components is discussed below.

PLD 102 may be implemented using a chip (e.g., a packaged semiconductor device), a chip assembly, and/or other types of hardware components that may be programmable, configurable, and/or participate in providing computer implemented services.

CWGC 104 may be implemented using electrical components (e.g., chips, discrete elements such as resistors, capacitors, diodes, etc.) that may be arranged to form reconfigurable circuits.

When manufactured, PLD 102 may operate in a particular manner, and may be adapted to obtain and use operation information to update its operation. To obtain the operation information, PLD 102 may be operably connected to CWGC 104 using single pin connection 106.

CWGC 104 may be adapted (e.g., include elements arranged in a particular manner) to communicate with PLD 102 and/or other hardware components of data processing system 100. For example, CWGC 104 may provide an electrical signal (e.g., the complex waveform) to PLD 102 that varies over a period of time. The varying electrical signal may be interpreted by PLD 102 as the complex waveform, and the complex waveform may have operation information encoded on the complex waveform.

To provide the varying electrical signal, CWGC 104 may include a chargeable power source. The power source may be charged by PLD 102 (and/or other components of data processing system 102) to a predetermined charge level via single pin connection 106. After reaching the predetermined charge level, CWGC 104 may generate the varying electrical signal (and therefore, the complex waveform) using the charged power source (the power source may be disconnected from CWGC 104 while the varying electrical signal is generated).

To encode the complex waveform with the operation information, CWGC 104 may include one or more portions of circuitry. The one or more portions of circuitry may each include electrical components (e.g., resistor(s) 114A-114N) that directly impact a number of characteristics of the complex waveform including, for example, decay rate, duty cycle, period/frequency, etc. The number of characteristics may be used to convey the operation information to a receiver of the complex waveform. The receiver of the complex waveform (e.g., PLD 102) may use (e.g., measure) the number of characteristics (directly or indirectly) to perform a lookup process (or another type of analysis) to identify the operation information. Thus, by modifying resistors of the portions of the circuitry, CWGC 104 may generate different complex waveforms having different operation information encoded.

The one or more portions of circuitry may include (i) a decay portion, (ii) a frequency portion, and/or (iii) a duty cycle portion. By modifying electrical components (e.g., swapping out resistors with different resistors of different resistance values) from one or more of these portions, the varying electric signal may be modified. By modifying the varying electrical signal, the characteristics of the complex waveform may be modified, and as such, the encoded operation information may also be modified. Refer to FIGS. 2A-2D for details regarding the one or more portions of circuitry of CWGC 104 and how the complex waveform may be interpreted by PLD 102.

Encoding the complex waveforms with operation information may enable easy and robust quality control in a factory environment. For example, values of resistors included in circuits may be verified quickly (e.g., using digital multimeters) and accurately. In contrast, semiconductor based data storage devices such as electrically erasable programmable gate arrays may be challenging to test in factory environments due to power requirements and digital logic evaluation equipment.

By using the one or more portions of circuitry that can be verified by measurement of resistor value rather than through evaluation of the function of semiconductor devices, the burden for verifying desired operation of data processing systems may be reduced. Thus, embodiments disclosed herein may increase the likelihood of a successfully producing data processing systems with desired operation through manufacturing processes.

Figure 3:
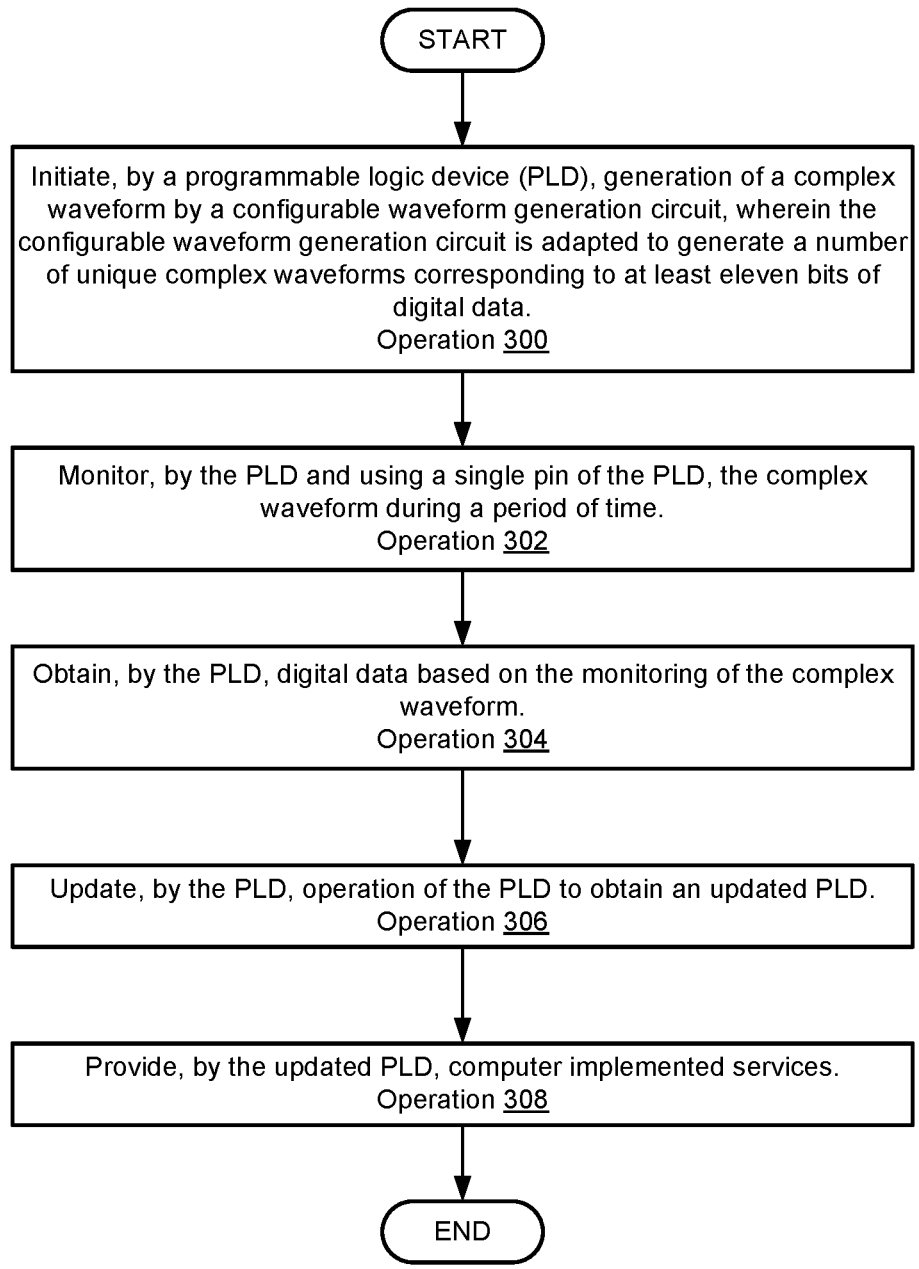
FIG. 3 shows a flow diagram illustrating a method for providing computer implemented services in accordance with an embodiment.

When providing its functionality, PLD 102 and/or CWGC 104 (and/or any other configurable hardware components of data processing system 100) may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, PLD 102 may be operably connected to configurable waveform generation circuit 104 via a single pin connection (e.g., 106).

While illustrated in FIG. 1 as including a limited number of specific components, a system in accordance with an embodiment may include fewer, additional, and/or different components than those illustrated therein.

Figure 2A:
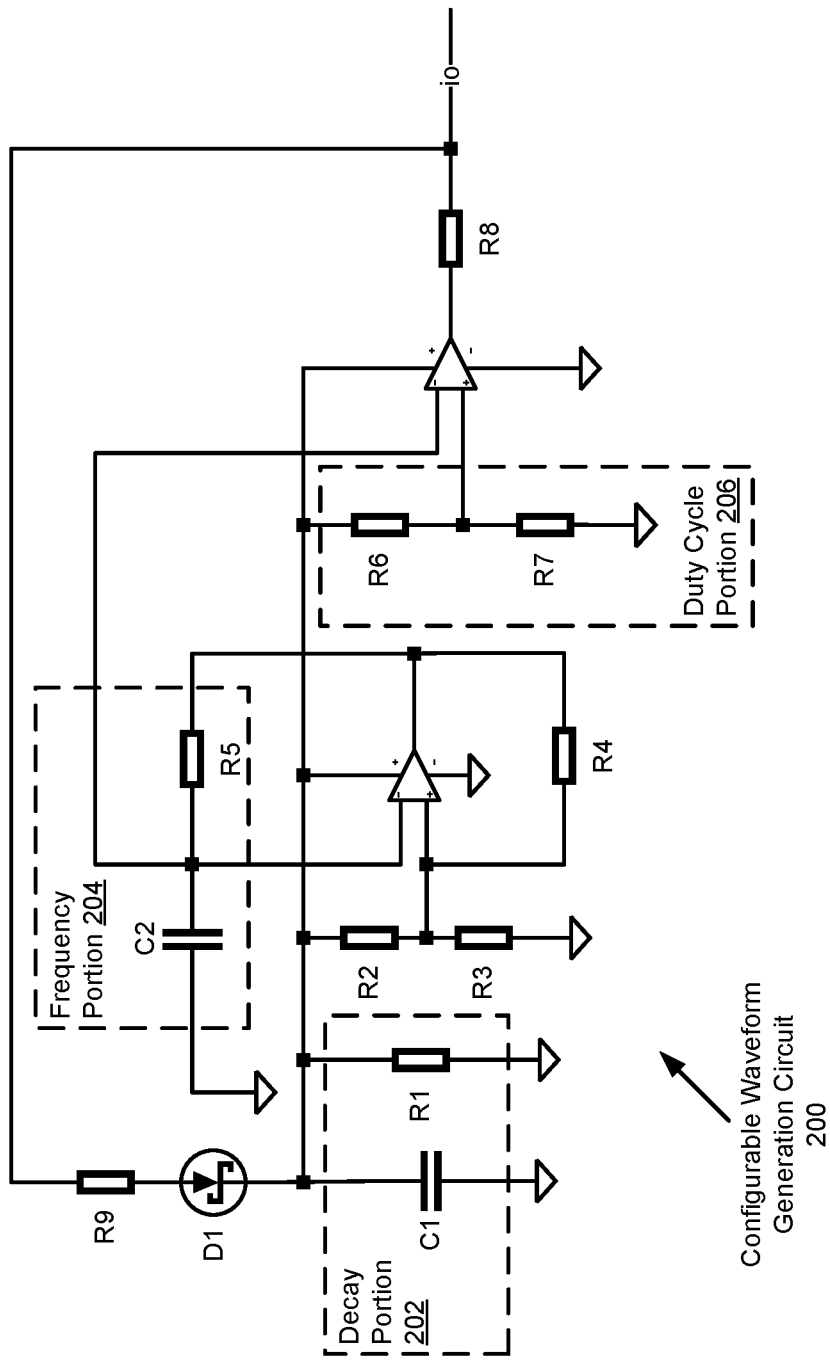
FIG. 2A shows a diagram illustrating a configurable waveform generation circuit in accordance with an embodiment.
Figure 2B:
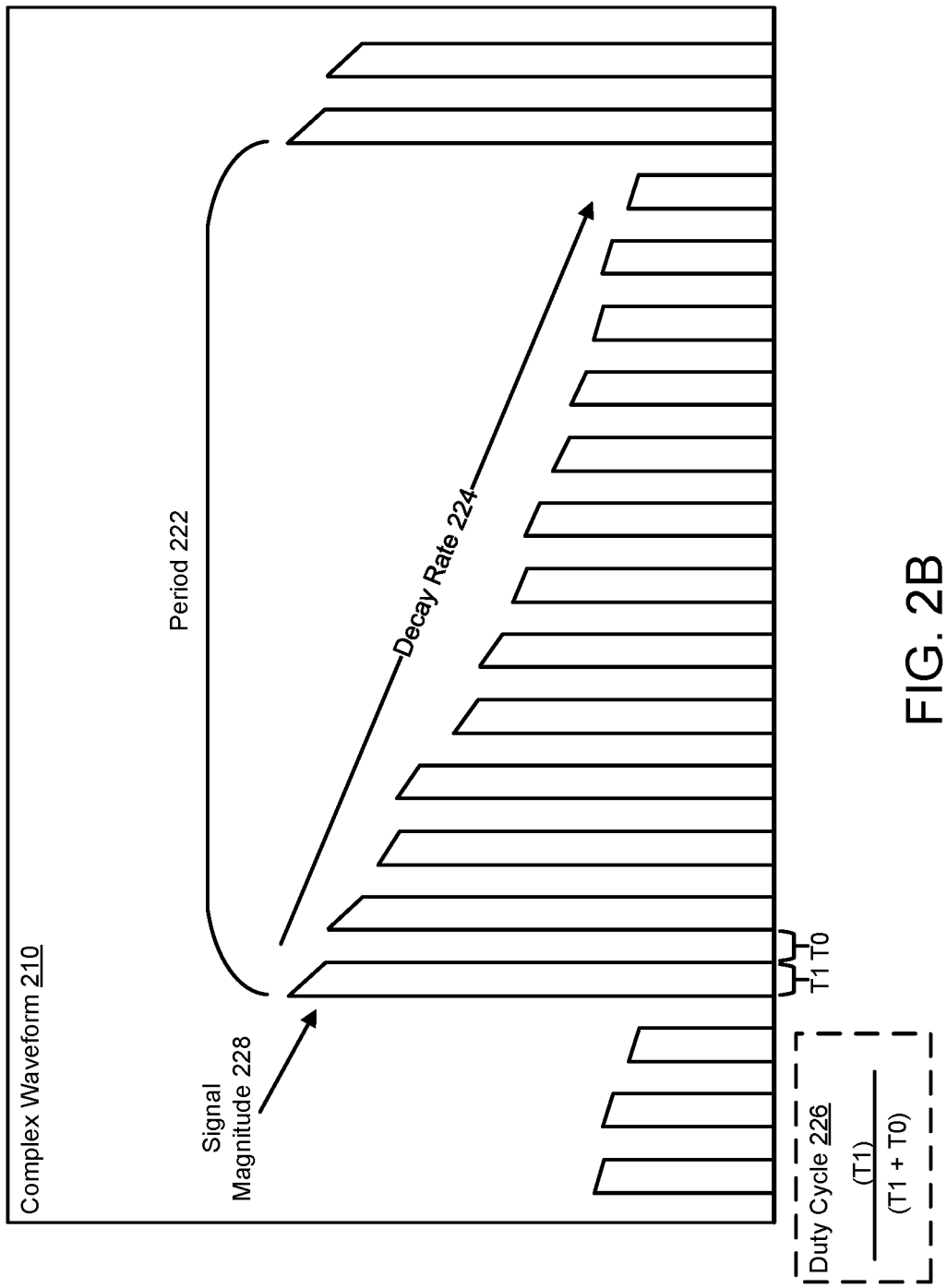
FIG. 2B shows a diagram illustrating a complex waveform in accordance with an embodiment.
Figure 2C:
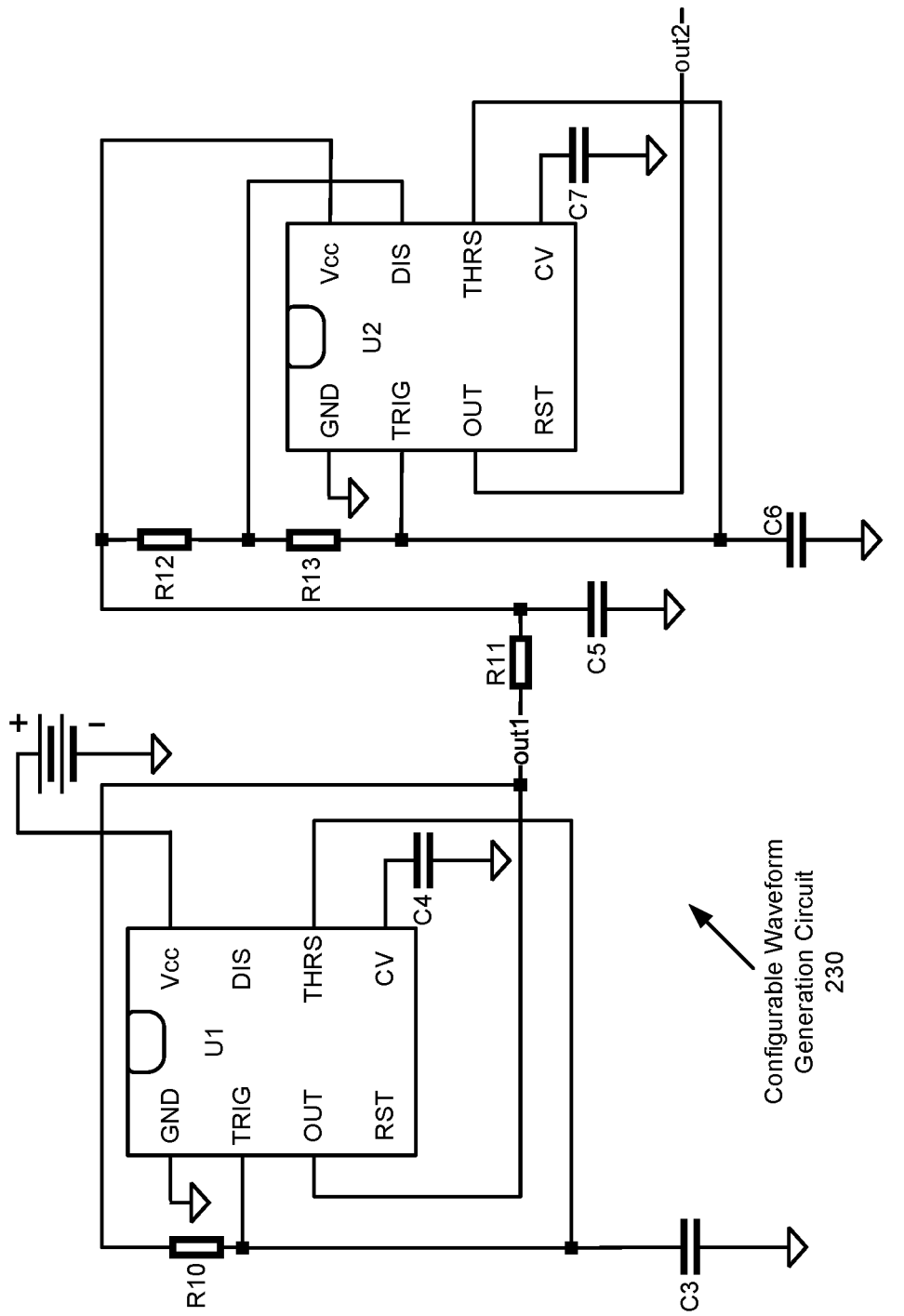
FIG. 2C shows a diagram illustrating a configurable waveform generation circuit in accordance with an embodiment.
Figure 2D:
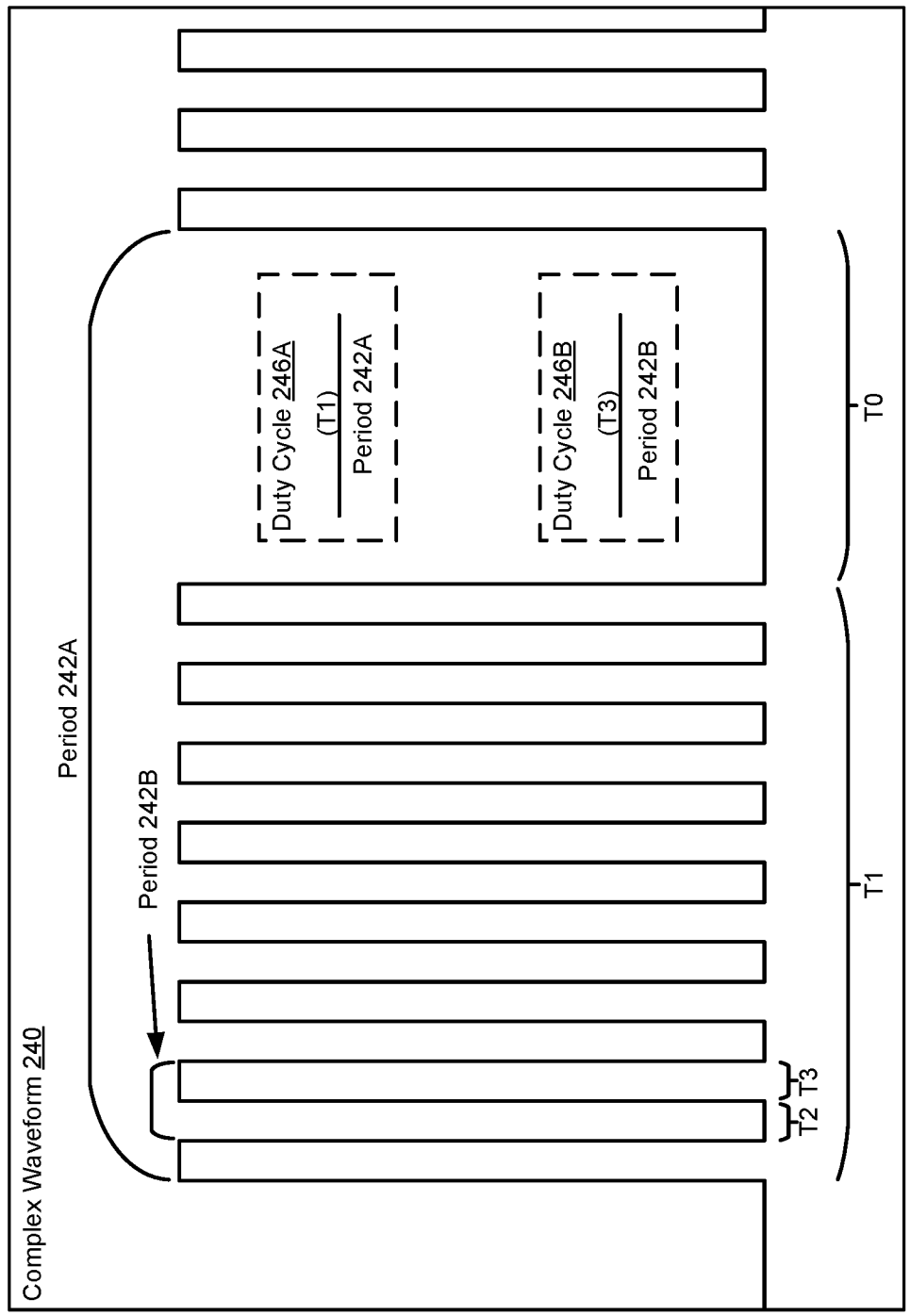
FIG. 2D shows a diagram illustrating a complex waveform in accordance with an embodiment.

To further clarify embodiments disclosed herein, diagrams illustrating a configurable waveform generation circuit in accordance with an embodiment are shown in FIGS. 2A and 2C, and diagrams illustrating a complex waveform in accordance with an embodiment are shown in FIGS. 2B and 2D.

Turning to FIG. 2A, a diagram illustrating a configurable waveform generation circuit (e.g., 200) in accordance with an embodiment is shown. Configurable waveform generation circuit (CWGC) 200 may be similar to CWGC 104 shown in FIG. 1, and as previously described, may be implemented using electrical components.

CWGC 200 may include functionality to generate a number of unique complex waveforms (e.g., one at a time depending on configuration of CWGC 200). The unique complex waveforms may be used to convey large amounts of digital information with varying content to a programmable logic device (e.g., 102) or other type of device. When produced, a unique complex waveform generated by CWGC 200 may be used to convey information to the PLD usable to configure the PLD.

To provide this functionality, CWGC 200 may be implemented using configurable portions of circuitry (e.g., the one or more portions of circuitry, previously mentioned). The configurable portions of circuitry may allow substitution of electrical components (e.g., resistor(s) 114A-114N) to modify a configuration of the configurable portions of circuitry. By modifying the configuration of the configurable portions of circuitry, characteristics of the unique complex waveform may also be modified. Therefore, reconfiguring one or more of the configurable portions of circuitry (e.g., through substitution of resistors of different values) may allow CWGC 200 to generate complex waveforms that includes characteristics that depend on the configurations of the one or more configurable portions of circuitry.

For example, a resistor that is part of a configurable circuitry portion may have a resistance of $100k$ ohms. Based on the resistance of the resistor, CWGC 200 may generate a first complex waveform. A different resistor, with a resistance of $110k$ ohms, may be substituted in place of the resistor. Based on the resistance of the different resistor, CWGC 200 may generate a second complex waveform that is different from the first complex waveform. These two different complex waveforms may convey different digital data (e.g., different operation information) to a receiver (e.g., PLD 102) of the respective complex waveforms.

The configurable portions of circuitry may include decay portion 202, frequency portion 204, and duty cycle portion 206. Each of these portions is discussed below. Decay portion 202 may control a rate of decay of a complex waveform and/or duration of the decay (e.g., between a start to when a predetermined level of decay has occurred). Decay portion 202 may be implemented by a first portion of circuitry from CWGC 200. The first portion may include electrical components such as a first resistor R1. When a complex waveform is generated by CWGC 200, the decay rate and duration of the decay of the complex waveform may depend on a first value (e.g., a first resistance) of first resistor R1.

For example, a first complex waveform may have a decay rate of 60% and a decay time of 10 milliseconds based on the resistance of first resistor R1. After first resistor R1 is replaced with a different resistor, CWGC 200 may generate a second complex waveform. The second complex waveform may be different to the first complex waveform because, based on the resistance of the different resistor, the second complex waveform may have a decay rate of 65% instead of 60%, and a decay time of 8 milliseconds instead of the 10 milliseconds. This decay rate and/or decay time may be identifiable by an interpreter (e.g., PLD 102) of the complex waveform.

To identify the decay time, a logic pin may monitor a duration of time when logic high or logic low signal is measured by the logic pin when ingesting the complex waveform. The logic pin may be coupled to circuitry which may convert analog voltage levels above a threshold to a logic high and analog voltage levels below the threshold to a logic low. Thus, by measuring the duration of time over which a logic high signal is measured, a duration of time between when the complex waveform starts and decays to a voltage level corresponding to the threshold may be identified using a logic pin. The decay duration may then be used, for example, to calculate the rate of decay, identify a resistor value that controls the decay rate, and/or identify some digital information corresponding to how the decay rate has been established.

Alternatively, an analog to digital conversion pin may be utilized to directly sample the voltage level of the complex waveform over time. The sampled voltage levels may be used to directly calculate the decay rate (e.g., rate of reduction of the voltage level over time).

Frequency portion 204 may control a frequency rate of the complex waveform. Frequency portion 204 may be implemented by a second portion of circuitry from CWGC 200. The second portion may include electrical components such as second resistor R5. When the complex waveform is generated by CWGC 200, a period (and corresponding frequency) of the complex waveform may depend on a second value (e.g., a second resistance) of second resistor R5.

For example, second resistor R5 may have a resistance of $1k$ ohms. Based on the resistance of second resistor R5, CWGC 200 may generate a first complex waveform. A second different resistor, with a resistance of $2k$ ohms, may be substituted in place of second resistor R5. Replacing second resistor R5 may impact characteristics (e.g., the frequency) of the first complex waveform. Therefore, following replacement of second resistor R5 with the second different resistor, CWGC 200 may generate a second complex waveform (e.g., with a frequency of 0.4 Hz, while the first complex waveform may have had a frequency of 0.5 Hz) in place of the first complex waveform. These different frequencies may be detectable by an interpreter (e.g., PLD 102) of the complex waveforms.

Duty cycle portion 206 may control a duty cycle of the complex waveform. Duty cycle portion 206 may be implemented by a third portion of circuitry from CWGC 200. The third portion may include electrical components such as third resistor R6 and/or fourth resistor R7. When a complex waveform is generated by CWGC 200, a duty cycle of the complex waveform may depend on a third value (e.g., a third resistance) of third resistor R6 and/or a fourth value (e.g., a fourth resistance) of fourth resistor R7.

For example, third resistor R6 and fourth resistor R7 may have a resistance of 300 k ohms and 700 k ohms, respectively. Based on the resistances of third resistor R6 and fourth resistor R7, CWGC 200 may generate a first complex waveform. A third different resistor, with a resistance of 400 k ohms, may be substituted in place of third resistor R6.

Replacing third resistor R6 may impact characteristics (e.g., the duty cycle) of the first complex waveform. Therefore, following replacement of third resistor R6 with the third different resistor, CWGC 200 may generate a second complex waveform (e.g., with a duty cycle of 55%, while the first complex waveform may have had a duty cycle of 60%) in place of the first complex waveform. These different duty cycles may be detectable by an interpreter of the complex waveforms.

While described with respect to three example portions, it will be appreciated that CWGC 200 may include any number of portions that may impact any number of characteristics of a complex waveform. Thus, any amount of digital information may be encoded on the complex waveform (e.g., limited by the ability for high fidelity complex waveforms to be generated due to component limits and/or physical limits).

While described in FIG. 2A with respect to the one and/or two electrical components on which characteristics of the complex waveform depend on, it will be appreciated that each of the configurable portions of circuitry may include any number and/or type of electrical components on which the characteristics of resulting complex waveforms may depend.

Additionally, while illustrated in FIG. 2A as having specific electrical components in a specific arrangement, it will be appreciated that the arrangement of electrical components is merely illustrative, and the arrangements may be different without departing from embodiments disclosed herein.

Turning to FIG. 2B, a diagram illustrating a complex waveform (e.g., 210) in accordance with an embodiment is shown. Complex waveform 210 may be an example of a waveform produced using the circuitry shown in FIG. 2A.

In FIG. 2B, time may progress from left to right across the page, and the magnitude of the waveform (e.g., magnitude of the voltage produced by the circuitry) may increase from bottom to top of the page (e.g., as a pulse). For example, the magnitude of the voltage produced by the circuitry over time T1 is indicated by a pulse from the bottom to the top of the page over time T1.

As seen in FIG. 2B, complex waveform 210 may be a waveform that (i) decays over time, (ii) has a frequency of repetition, and (iii) has a duty cycle for each repetition. The rate of decay may be based on a first resistor value of the circuitry, the frequency of repetition may be based on a second resistor value of the circuitry, and the duty cycle may be based on a third resistor value of the circuitry.

For example, in FIG. 2B, the rate of decay is represented by the progressively decreasing magnitudes of voltage pulses during period 222. As seen in FIG. 2B, at the beginning of period 222, a first pulse has a magnitude of a first level (e.g., at signal magnitude 228), and the last pulse has a much lower voltage level, with the pulses in between following an exponential decay pattern (e.g., depicted using an arrow of decay rate 224). The rate of this exponential decay may be controlled by the first resistor. Thus, different rates of decay (and corresponding lower or higher voltage levels of the last pulse) may be obtained through changing the first resistor for other resistors of different values.

Similarly, for example, different duty cycles may be obtained through changing the third resistor for other resistors of different values. In FIG. 2B, the duty cycle for each repetition (e.g., during the time of period 222) is represented by a duty cycle ratio (e.g., duty cycle 226). The duty cycle ratio may indicate a ratio of time during each repetition in which complex waveform 210 has pulses of a magnitude above zero (e.g., time T1) versus a total duration of a cycle (e.g., T1+T0). An amount of time in which complex waveform 210 has a pulse with a magnitude above zero (e.g., during time T1) may be divided by an amount of time in which complex waveform 210 has the pulse with the magnitude above zero and a pulse with a magnitude of zero (e.g., a total amount of time for each repetition to be completed) to obtain the duty cycle ratio.

While illustrated in FIG. 2B as having specific characteristics, it will be appreciated that the characteristics of complex waveform 210 are merely illustrative, and the characteristics may be different without departing from embodiments disclosed herein. For example, complex waveform 210 may be of higher complexity and may include multiple identifiable decay rates (e.g., of different portions of the waveform), multiple identifiable frequencies, multiple identifiable duty cycles, etc.

Turning to FIG. 2C, a diagram illustrating a configurable waveform generation circuit (e.g., 230) in accordance with an embodiment is shown. Configurable waveform generation circuit (CWGC) 230 may be similar to CWGC 104 shown in FIG. 1, and as previously described, may be implemented using electrical components.

CWGC 230 may include functionality to generate a number of unique complex waveforms. The unique complex waveforms may be used to convey a large amount of digital information with varying content to a programmable logic device (e.g., 102) or other type of device. When produced, unique complex waveforms generated by CWGC 230 may be used to convey information to the PLD usable to configure the PLD.

To provide this functionality, CWGC 230 may be implemented using configurable circuitry that includes cascading timers (e.g., semiconductor based devices, such as chips). Similar to the configurable portions of circuitry discussed with respect to FIG. 2A, the configurable circuitry (that includes the cascading timers) may allow substitution of electrical components (e.g., resistor(s) 114A-114N) such as resistors R10-R13 to modify a configuration of the configurable circuitry. By modifying the configuration of the configurable circuitry, characteristics of the complex waveform produced by configurable waveform generation circuitry 230 may also be modified. Therefore, reconfiguring the configurable circuitry may allow CWGC 230 to generate complex waveforms that present different characteristics which may be measured/interpreted to obtain corresponding digital information.

For example, CWGC 230 may generate a first complex waveform based on resistance values of resistor(s) R10-R13. By substituting one or more resistors of resistor(s) R10-R13 with one or more different resistors of different resistance values, CWGC 230 may generate a second complex waveform that is different to the first complex waveform.

As seen in FIG. 2C, CWGC 230 (e.g., the cascading timers) may include a first timer (e.g., 555 timer "U1") portion and a second timer (e.g., 555 timer "U2") portion. The first timer portion and the second timer portion may cascade in a manner in which the first timer portion operates as a mask for the second timer portion. By doing so, a complex waveform generated by CWGC 230 may include two sub-waveforms (refer to FIG. 2D for additional information regarding each of the two sub-waveforms). Each of the two sub-waveforms may include characteristics such as a period, a duty cycle, etc. Thus, the complex waveform generated by CWGC 230 may include two of each type of characteristic (e.g., two periods, two duty cycles, etc.), as discussed with respect to FIG. 2D.

While described with respect to two example portions, it will be appreciated that CWGC 230 may include any number of portions that may impact any number of characteristics of a complex waveform. Thus, any amount of digital information may be encoded on the complex waveform (e.g., limited by the ability for high fidelity complex waveforms to be generated due to component limits and/or physical limits).

While described in FIG. 2C with respect to the one and/or two electrical components on which characteristics of the complex waveform depend on, it will be appreciated that each of the configurable portions of circuitry may include any number and/or type of electrical components on which the characteristics of resulting complex waveforms may depend.

Additionally, while illustrated in FIG. 2C as having specific electrical components in a specific arrangement, it will be appreciated that the arrangement of electrical components is merely illustrative, and the arrangements may be different without departing from embodiments disclosed herein.

Turning to FIG. 2D, a diagram illustrating a complex waveform (e.g., 240) in accordance with an embodiment is shown. Complex waveform 240 may be an example of a waveform produced using the circuitry shown in FIG. 2C.

In FIG. 2D, time may progress from left to right across the page, and the magnitude of the waveform (e.g., magnitude of the voltage produced by the circuitry) may increase from bottom to top of the page (e.g., as a pulse). For example, the magnitude of the voltage produced by the circuitry over time T3 is indicated by a pulse from the bottom to the top of the page over time T3.

In FIG. 2D, complex waveform 240 may include two or more sub-waveforms. Each of the sub-waveforms may (i) have a frequency of repetition, and (ii) have a duty cycle for each repetition. Similar to complex waveform 210, the frequency of repetition may be based on resistor values of the circuitry, and the duty cycle may be based on other resistor values of the circuitry. As discussed with regard to FIG. 2C, the circuitry may include the first timer portion and the second timer portion, and each of the portions may facilitate the generation of one of the two or more sub-waveforms. For example, the first timer portion may generate (e.g., at out1 from FIG. 2C) a first sub-waveform with period 242A and duty cycle 246A, and the second timer portion may generate (e.g., at out2 from FIG. 2C) a second sub-waveform with period 242B and duty cycle 246B.

As seen in FIG. 2D, throughout period 242A, the first sub-waveform may include two pulses during period 242A. A first of the two pulses may occur during time T1, and a second of the two pulses may occur during time T0. The first of the two pulses may have a magnitude at a level above zero. The second of the two pulses may have a magnitude of zero.

As mentioned with regard to FIG. 2C, the first timer portion and the second timer portion may cascade in a manner in which the first timer portion operates as a mask for the second timer portion. For example, the first of the two pulses may include a first portion of pulses (e.g., pulses throughout time T1) that may include various pulses with a magnitude at a level above zero (e.g., during time T3). Due to the masking effect (e.g., turning the second cascaded circuit on and off depending on the output of the first cascaded circuit) of the first sub-waveform, the various pulses that occur during the time T1 may be repetitions of the second sub-waveform.

Similarly, a second portion of pulses (e.g., during time T0) may include additional various pulses (of the second sub-waveform) with a magnitude at a level above zero. However, due to the masking effect of the first sub-waveform (the first sub-waveform having a magnitude of zero during time T0), any of the additional various pulses from the second portion of pulses that have a magnitude at a level above zero may instead be shown to have a magnitude of zero (and thus, such pulses with a magnitude of zero may be indicated by a lack of explicitly illustrated pulses throughout time T0).

While illustrated in FIG. 2D as having specific characteristics, it will be appreciated that the characteristics of complex waveform 210 are merely illustrative, and the characteristics may be different without departing from embodiments disclosed herein.

By utilizing configurable portions of circuitry, modifying electrical components (e.g., swapping out resistors with different resistors of different resistance values) from one or more of these portions allows a varying electric signal, provided by a configurable waveform generation circuit, to be modified. By modifying the varying electrical signal, characteristics of a complex waveform (received based on the varying electrical signal) may be modified. Thus, encoded operation information (encoded with the complex waveform) may also be modified.

As discussed above, the components of FIGS. 1-2D may perform various methods to provide computer implemented services. FIG. 3 illustrates a method that may be performed by the components of FIGS. 1-2D. In the diagram discussed below and shown in these figures, any of the operations may be repeated, performed in different orders, omitted, and/or performed in parallel with or a partially overlapping in time manner with other operations.

Turning to FIG. 3, a flow diagram illustrating a method for providing computer implemented services in accordance with an embodiment is shown. The method may be performed by data processing system 100, programmable logic device (PLD) 102, configurable waveform generation circuit (CWGC) 104, and/or other components of the system of FIG. 1.

At operation 300, generation of a complex waveform, by a configurable waveform generation circuit (CWGC), is initiated by a programmable logic device (PLD). The configurable waveform generation circuit may be adapted to generate a number of unique complex waveforms corresponding to at least eleven bits of digital data. The generation may be initiated by charging a power source (e.g., a diode "D1" as shown in FIG. 2A) of the CWGC. The power source may be charged to a predetermined charge level before the charging is discontinued. Once the charge reaches the predetermined charge level, generation of the complex waveform may be initiated. The complex waveform may be generated as the charged power source allows for the CWGC to provide a varying electrical signal to the PLD (as discussed with regard to FIGS. 2A-2D) over a period of time. The varying electrical signal may be interpreted by the PLD to obtain the complex waveform. The varying electric signal may have characteristics controlled by values of resistors of the CWGC.

At operation 302, the complex waveform may be monitored during the period of time by the PLD and using a single pin of the PLD. The complex waveform may be monitored by identifying characteristics of the complex waveform. The characteristics may be identified by analyzing a magnitude of voltage from the varying electrical signal over the period of time. The characteristics may include (i) a period of the complex waveform, (ii) a frequency of the complex waveform, (iii) a duty cycle of the complex waveform, and/or (iv) other identifiable characteristics of the complex waveform.

Additionally, a complex waveform may include one or more sub-waveforms (as discussed with regard to FIG. 2D). Each of the sub-waveforms may include corresponding characteristics that may be monitored by the PLD.

At operation 304, digital data is obtained by the PLD based on the monitoring of the complex waveform. The digital data may be obtained by using the identified characteristics of the complex wave form (identified during monitoring of the complex waveform) to identify values for the electronic components of the CWGC. For example, (i) a first value of a first resistor of the GWGC may be identified based on the period of the complex waveform, (ii) a second value of a second resistor of the GWGC may be identified based on the frequency of the complex waveform, (iii) a third value of a third resistor of the GWGC may be identified based on the duty cycle of the complex waveform, and/or (iv) other values of other resistors of the GWGC may be identified based on the other identifiable characteristics of the complex waveform.

The identified values of electronic components (e.g., resistors) of the CWGC may then be used to obtain corresponding bit sequences. For example, (i) a first bit sequence may be obtained based on the first value of the first resistor, (ii) a second bit sequence may be obtained based on the second value of the second resistor, (iii) a third bit sequence may be obtained based on the third value of the third resistor, and/or (iv) other bit sequences may be obtained based on the other values of the other resistors of the GWGC. The aforementioned bit sequences may be combined to obtain the digital data.

By combining the bit sequences to obtain the digital data based on the complex waveform, the PLD may be provided with the at least eleven bits of digital data through the use of the single pin of the PLD.

While described with respect to identifying values of resistors and then identifying corresponding digital data, it will be appreciated that the characteristics of the complex waveform may be directly associated with the digital data. Thus, a direct lookup may be performed based on the characteristics of the complex waveform without performing an intermediate operation of identifying values of resistors or other electrical components used to generate the complex waveform.

At operation 306, operation of the PLD is updated by the PLD and using the digital data to obtain an updated PLD. The operation may be updated by modifying the operation of the PLD based on the digital data.

The operation may be updated, for example, by performing a lookup based on the digital data. The lookup may return operation information. To perform the lookup, for example, information may be read from storage and/or received from another device. The read and/or received information may include operation information associated with the obtained digital data. The associated operation information may include, for example, (i) requirements to be met by the PLD, (ii) possible changes to the operation of the PLD, (iii) an action that, when performed, modifies settings or other characteristics of the PLD that impact the manner in which the PLD operates, and/or (iv) other types of information usable to guide changes in operation of the PLD.

Once obtained, the associated operation information may be used to update operation of the PLD to place the PLD in condition to operate as indicated by the associated operation information. Thus, an updated PLD may be obtained based on the associated operation information.

While described with respect to lookups, the digital data may be associated with corresponding operation information in other manners without departing from embodiments disclosed herein. Thus, other types of operation may be performed with respect to the digital data may be performed to obtain the operation information, and/or the digital information may be the operation information itself.

At operation 308, computer implemented services may be provided by the updated PLD. The computer implemented services may be provided by invoking a functionality of the updated PLD. The functionality may be one of a group of functionalities capable of being executed using one or more hardware components of a data processing system in which the updated PLD is included.

For example, the data processing system may include other hardware components (other than the PLD and CWGC) that provide various functionalities that contribute to providing the computer implemented services. Other pins (other than the single pin) of the PLD may be operably connected to one or more of the other hardware components.

Prior to the operation of the PLD being updated, various pins of the PLD may be operably connected to unknown hardware components (unknown to the PLD) of the data processing system. By updating operation of the PLD, specific functionalities may be defined for each of the various pins. For example, one of the various pins may have a functionality that includes data storage services, while another of the various pins may have a functionality that includes facilitating communications.

The method may end following operation 308.

Thus, using the method illustrated in FIG. 3, embodiments disclosed herein may enable computer implemented services to be provided using PLD and/or other types of configurable devices. The type and/or quantity of the computer implemented services, and/or how the computer implemented services are to be provided, may depend on operation of the programmable logic devices. By utilizing digital data encoded in complex waveforms, a programmable logic device may interpret at least eleven bits of data using a single pin thereby allowing for the programmable logic device to provide additional functionalities using other available pins made available for other uses through transmission of larger amounts of digital data encoded on complex waveforms.

Figure 4:
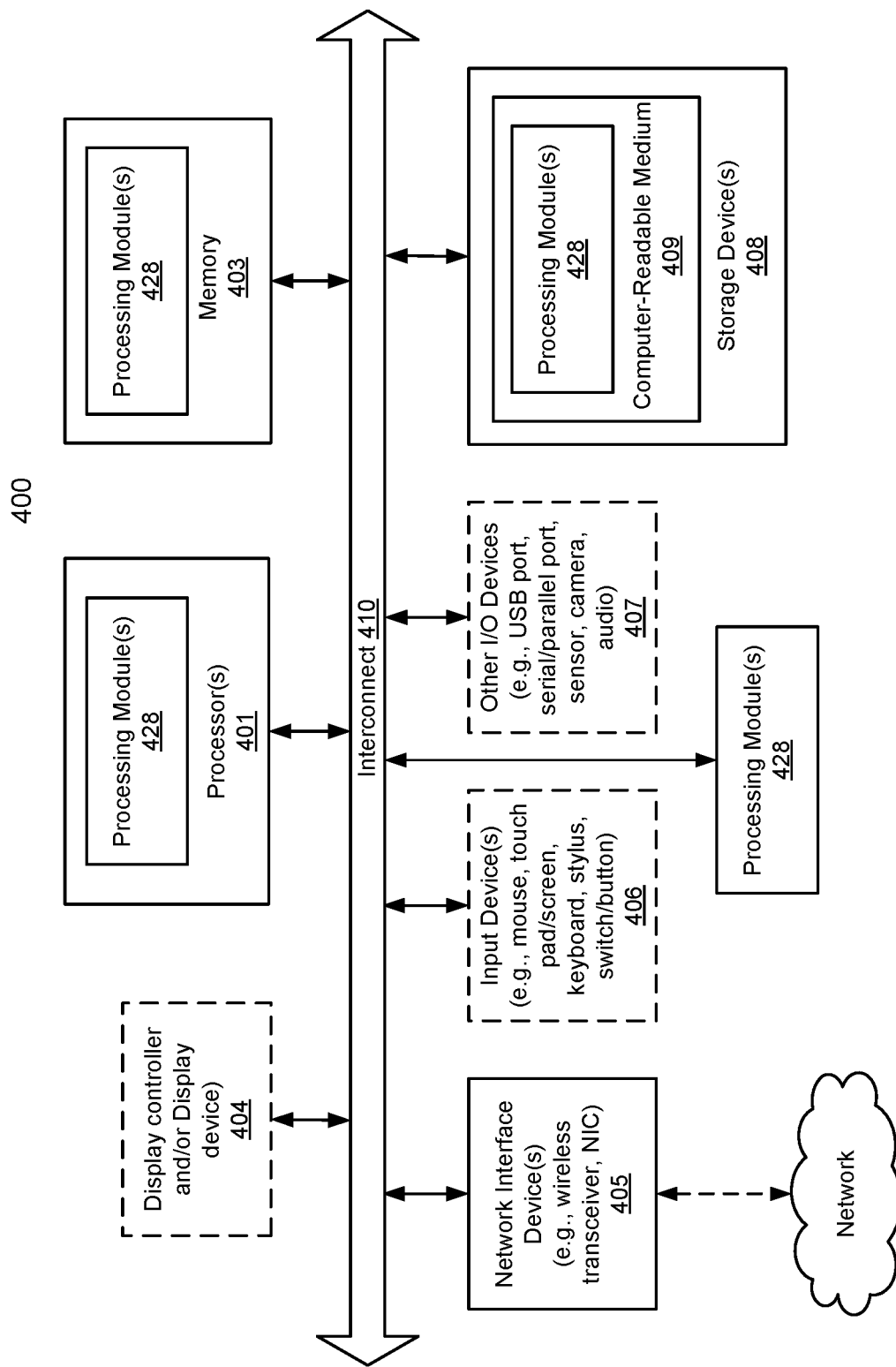
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICs, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing computer-implemented services, comprising:
    identifying, by a programmable logic device (PLD), a start up of a host data processing system;
    during the start up:
        initiating, by the PLD, generation of a complex waveform by a configurable waveform generation circuit, wherein the configurable waveform generation circuit is adapted to generate a number of unique complex waveforms corresponding to at least eleven bits of digital data;
        monitoring, by the PLD and using a single pin of the PLD, the complex waveform during a period of time;
        obtaining, by the PLD, digital data based on the monitoring of the complex waveform;
        updating, by the PLD and using the digital data, operation of the PLD to obtain an updated PLD; and
        providing, by the updated PLD, computer implemented services.

2. The method of claim 1, wherein initiating generation of the complex waveform comprises:
    charging a chargeable power source of the configurable waveform generation circuit to a predetermined charge level; and
    after reaching the predetermined charge level, discontinuing the charging to initiate the generation of the complex waveform.

3. The method of claim 1, wherein monitoring the complex waveform comprises:
    identifying a period of the complex waveform;
    identifying a frequency of the complex waveform;
    identifying a duty cycle of the complex waveform; and
    identifying a decay rate of the complex waveform.

4. The method of claim 3, wherein obtaining the digital data comprises:
    identifying a first value of a first resistor of the configurable waveform generation circuit based on the period of the complex waveform;
    identifying a second value of a second resistor of the configurable waveform generation circuit based on the frequency of the complex waveform; and
    identifying a third value of a third resistor of the configurable waveform generation circuit based on the duty cycle of the complex waveform.

5. The method of claim 4, wherein obtaining the digital data further comprises:
    obtaining a first bit sequence based on the first value of the first resistor;
    obtaining a second bit sequence based on the second value of the second resistor; and
    obtaining a third bit sequence based on the third value of the third resistor.

6. The method of claim 5, wherein obtaining the digital data further comprises obtaining a combination of bit sequences comprising:
    the first bit sequence;
    the second bit sequence; and
    the third bit sequence.

7. The method of claim 1, wherein the configurable waveform generation circuit comprises:
    a first portion comprising:

a chargeable power source adapted to provide power to the configurable waveform generation circuit while charged, and a first resistor, wherein a decay rate of the complex waveform is based on the first resistor;

a second portion comprising:

a triangular wave generator adapted to generate a triangular waveform, and a second resistor, wherein a frequency of the complex waveform is based on the second resistor; and a third portion:

comprising a third resistor, wherein a duty cycle of the complex waveform is based on the third resistor, and adapted to generate the complex waveform.

8. The method of claim 1, wherein the configurable waveform generation circuit comprises:

a first timer; and a second timer, wherein the first time and the second timer are cascaded so that the first timer operates as a mask for the second timer.

9. A non-transitory machine-readable medium having instructions stored therein, which when executed by a processor, cause the processor to perform operations for providing computer implemented service, the operations comprising:

identifying, by a programmable logic device (PLD), a start up of a host data processing system;

during the start up:

initiating, by the PLD, generation of a complex waveform by a configurable waveform generation circuit, wherein the configurable waveform generation circuit is adapted to generate a number of unique complex waveforms corresponding to at least eleven bits of digital data;

monitoring, by the PLD and using a single pin of the PLD, the complex waveform during a period of time;

obtaining, by the PLD, digital data based on the monitoring of the complex waveform;

updating, by the PLD and using the digital data, operation of the PLD to obtain an updated PLD; and providing, by the updated PLD, the computer implemented services.

10. The non-transitory machine-readable medium of claim 9, wherein monitoring the complex waveform comprises:

identifying a period of the complex waveform;

identifying a frequency of the complex waveform;

identifying a duty cycle of the complex waveform; and identifying a decay rate of the complex waveform.

11. The non-transitory machine-readable medium of claim 10, wherein obtaining the digital data comprises:

identifying a first value of a first resistor of the configurable waveform generation circuit based on the period of the complex waveform;

identifying a second value of a second resistor of the configurable waveform generation circuit based on the frequency of the complex waveform; and identifying a third value of a third resistor of the configurable waveform generation circuit based on the duty cycle of the complex waveform.

12. The non-transitory machine-readable medium of claim 11, wherein obtaining the digital data further comprises:

obtaining a first bit sequence based on the first value of the first resistor;

obtaining a second bit sequence based on the second value of the second resistor; and obtaining a third bit sequence based on the third value of the third resistor.

13. The non-transitory machine-readable medium of claim 12, wherein obtaining the digital data further comprises obtaining a combination of bit sequences comprising:

the first bit sequence;

the second bit sequence; and the third bit sequence.

14. The non-transitory machine-readable medium of claim 9, wherein the configurable waveform generation circuit comprises:

a first portion comprising:

a chargeable power source adapted to provide power to the configurable waveform generation circuit while charged, and a first resistor, wherein a decay rate of the complex waveform is based on the first resistor;

a second portion comprising:

a triangular wave generator adapted to generate a triangular waveform, and a second resistor, wherein a frequency of the complex waveform is based on the second resistor; and a third portion:

comprising a third resistor, wherein a duty cycle of the complex waveform is based on the third resistor, and adapted to generate the complex waveform.

15. A data processing system, comprising:

a programmable logic device (PLD); and a memory coupled to the PLD to store instructions, which when executed by the PLD, cause the PLD to perform operations for providing computer implemented service, the operations comprising:

identifying a start up of the data processing system;

during the start up:

initiating generation of a complex waveform by a configurable waveform generation circuit, wherein the configurable waveform generation circuit is adapted to generate a number of unique complex waveforms corresponding to at least eleven bits of digital data;

monitoring, using a single pin of the PLD, the complex waveform during a period of time;

obtaining digital data based on the monitoring of the complex waveform;

updating, using the digital data, operation of the PLD to place the PLD into an updated state; and providing, by the PLD while in the updated state, the computer implemented services.

16. The data processing system of claim 15, wherein monitoring the complex waveform comprises:

identifying a period of the complex waveform;

identifying a frequency of the complex waveform;

identifying a duty cycle of the complex waveform; and identifying a decay rate of the complex waveform.

17. The data processing system of claim 16, wherein obtaining the digital data comprises:

identifying a first value of a first resistor of the configurable waveform generation circuit based on the period of the complex waveform;

identifying a second value of a second resistor of the configurable waveform generation circuit based on the frequency of the complex waveform; and identifying a third value of a third resistor of the configurable waveform generation circuit based on the duty cycle of the complex waveform.

18. The data processing system of claim 17, wherein obtaining the digital data further comprises:
   obtaining a first bit sequence based on the first value of the first resistor;
   obtaining a second bit sequence based on the second value of the second resistor; and
   obtaining a third bit sequence based on the third value of the third resistor.

19. The data processing system of claim 18, wherein obtaining the digital data further comprises obtaining a combination of bit sequences comprising:
   the first bit sequence;
   the second bit sequence; and
   the third bit sequence.

20. The data processing system of claim 15, wherein the configurable waveform generation circuit comprises:
   a first portion comprising:
      a chargeable power source adapted to provide power to the configurable waveform generation circuit while charged, and
      a first resistor, wherein a decay rate of the complex waveform is based on the first resistor;
   a second portion comprising:
      a triangular wave generator adapted to generate a triangular waveform, and
      a second resistor, wherein a frequency of the complex waveform is based on the second resistor; and
   a third portion:
      comprising a third resistor, wherein a duty cycle of the complex waveform is based on the third resistor, and
      adapted to generate the complex waveform.

* * * * *